United States Patent [19]

Maeda et al.

[11] 4,145,643
[45] Mar. 20, 1979

[54] CONTROL APPARATUS FOR DRIVING A PULSE MOTOR

[75] Inventors: Yoshio Maeda; Koichi Matsumoto, both of Katsuta, Japan

[73] Assignee: Hitachi, Ltd., Japan

[21] Appl. No.: 797,692

[22] Filed: May 17, 1977

[30] Foreign Application Priority Data

Sep. 3, 1976 [JP] Japan .................................. 51-104863

[51] Int. Cl.$^2$ ............................................ G05B 19/40
[52] U.S. Cl. .................................... 318/696; 318/138
[58] Field of Search ............... 318/696, 685, 254, 138; 378/44; 235/151.11

[56] References Cited

U.S. PATENT DOCUMENTS

| 3,908,195 | 9/1975 | Leenhouts | 318/696 |
| 3,990,014 | 11/1976 | Hakozaki | 318/696 |

*Primary Examiner*—Herman J. Hohauser
*Attorney, Agent, or Firm*—Craig & Antonelli

[57] ABSTRACT

A control apparatus for driving a pulse motor which receives from a computer or the like a command signal indicative of the number of drive pulses to be applied to the pulse motor within a given time interval in order to drive the pulse motor at a given rotating speed produces, in response to the command signal, drive pulses equal in number to the commanded number within that time interval, preferably with uniform distribution, and drives the pulse motor in accordance with the drive pulses.

10 Claims, 10 Drawing Figures

F I G. I

CONTROL APPARATUS FOR DRIVING A PULSE MOTOR

BACKGROUND OF THE INVENTION

1. Field of the Invention

The present invention relates to an apparatus for driving a pulse motor and more particularly to an apparatus for driving a pulse motor suitable for use in scientific instruments.

2. Description of the Prior Art

A pulse motor is driven through a pulse motor driver to step by a given physical angle inherent to the pulse motor for each of input signal pulses applied to the driver and the total rotation angle of the motor is controlled by the number of pulses applied thereto and the rotation speed is controlled by a pulse frequency thereof. Thus, since the pulse motor can precisely control the magnitude and speed of angular movement in digital manner, it has recently been employed in scientific instruments such as servo system or spectro-photometer X-Y plotter, X-Y recorder, peripheral units of digital computers or the like. Particularly, a system for controlling a scientific instrument such as spectrophotometer by a digital computer and handling data from the instrument has become popular. In such a system, the pulse motor is frequently used and driven under control of the digital computer.

In the pulse motor used in such a system, various improvements have been made in the pulse motor per se and a driving method thereof in order to reduce vibration and noise and to attain precise control. The pulse motor includes magnetic poles with polyphase exciting windings arranged around a rotor at an interval of a predetermined step angle between every adjacent two poles, and it is driven by exciting the exciting windings in a predetermined sequence. In a single phase exciting system in which the exciting windings are excited sequentially one at a time or two-phase exciting system in which adjacent two phase windings are excited at a time, a pulse motor having an inherent physical angle of as small as 0.5° to 2° by which it steps for each of input pulses has been developed. Further, a 1-2 phase exciting system in which the rotor is stopped intermediate to every two adjacent magnet poles, and a double 1-2 phase exciting system in which the rotor is stopped at each quarter position between every two adjacent magnet poles have been known. Those pulse motors and the driving methods therefor are particularly useful in the scientific instruments such as spectro-photometer which are very sensitive to vibration and require precise drive.

Heretofore, in such a system, necessary data processing has been carried out by a computer and the drive pulses require to drive the pulse motor have also been generated directly by respective drive commands produced from the computer. Accordingly, the time required for the computer to control the drive of the pulse motor have been very long as compared with the time required for data processing. On the other hand, the operation speed of the digital computer exclusively used to control the scientific instrument such as spectrophotometer, particularly that of a specific micro-computer incorporated into the instrument, is, in general, relatively slow. Let consider a practical pulse motor having exciting windings of four phases A, B, C and D with stepping angle of 0.9°. Assume that this pulse motor is driven by the 1-2 phase exciting system in which the phase windings are excited in the sequence of A → (A and B) → B → (B and C) → C → (C and D) → D → (D and A) in response to the input pulses so that the rotor is rotated by physical angle of 0.45° with each input pulse and at a speed of 5 revolutions per second. In this case, it is necessary to drive the pulse motor by a pulse train having a frequency of 4,000 Hz and a repetition period of 250 micro-seconds. If the drive of the pulse motor is to be controlled by a digital computer, which has an average speed of several tens microseconds for execution of each command, most of the working time used by the computer would be spent for working relating to the drive of the pulse motor. Considering the fact that the operations of the digital computer are executed in predetermined time sequence, this means that there remains only a small time applicable to the control for other peripheral units connected to the digital computer and the execution of the data processing. Accordingly, when the pulse motor is driven by the digital computer of a slow operation speed, the drive speed of the pulse motor should be reduced in order to keep balance between the operation time for tasks such as the control of the peripheral units and that for control of the pulse motor.

SUMMARY OF THE INVENTION

It is an object of the present invention to provide a control apparatus for driving a pulse motor using a computer, which receives command signals at controlled time intervals from the computer, each command signal relating to a physical angle to be rotated within the respective controlled time interval, and, in response to each of the command signals, generates drive pulses of a frequency corresponding to the time interval and the physical angle of rotation to drive the pulse motor in accordance with the generated drive pulses. In this manner, the computer is required only to issue one drive command for each time interval and allowed to use the remaining time period for data processing.

It is another object of the present invention to provide a control apparatus for driving a pulse motor which generates the drive pulses of a controlled frequency such that the pulse motor is driven smoothly with minimum vibration and noise.

According to the present invention, a control apparatus for driving the pulse motor, which is driven through a pulse motor driver to rotate by a given physical angle for each of the drive pulses applied to the pulse motor driver, is provided to comprise means responsive to each of the drive command signals applied at controlled time intervals to receive and store a digital data relating to the number of drive pulses relating to a physical angle of rotation through which the pulse motor is to be rotated during a time interval between that command signal and the next command signal, and means for generating drive pulses the number of which is equal to the number corresponding to the stored digital data, within the time interval.

According to other aspect of the present invention, the rate of generation of the drive pulses in the control apparatus for driving the pulse motor is variable depending on either the magnitude of the value represented by said digital data or the length of said time interval.

DESCRIPTION OF THE PREFERRED EMBODIMENTS

Figure 1:
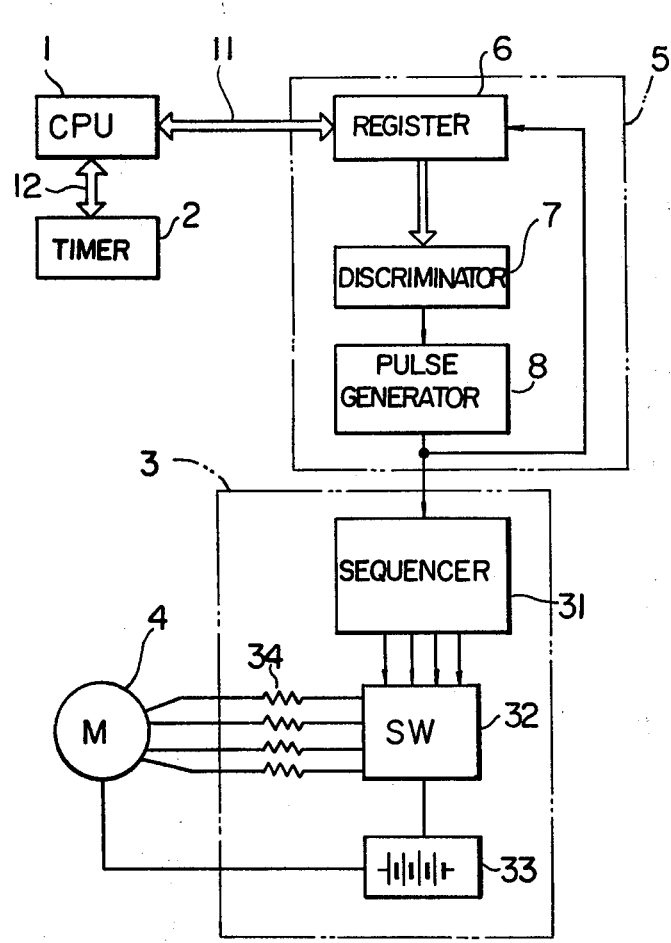
FIG. 1 is a block diagram illustrating one embodiment of a control apparatus for driving a pulse motor in accordance with the present invention.

Referring to FIG. 1, one embodiment of a control apparatus for driving a pulse motor in accordance with the present invention is shown as being operated by commands from a digital computer. In FIG. 1, a digital computer 1 including a memory unit and a central processing unit (CPU) is connected to a timer unit 2 and a pulse control circuit 5 through bus lines 11 and 12 including a data transfer bus and a control signal transfer bus. The timing unit 2 sends timing signals to the digital computer 1 through the bus line 12 at a given time interval which is independent from a drive speed of the pulse motor. The digital computer 1 computes the number of pulses to be applied to a pulse motor driver 3 during the given time interval based on a required drive speed of the pulse motor, that is, a physical angle of rotation through which the pulse motor is to be rotated within the given time interval. The number of pulses thus computed is converted to an n-bit data transfer signal, which is then transferred together with a pulse motor drive command signal to the pulse control circuit 5 via the bus line 11. The pulse control circuit 5 includes a register 6, a discriminator 7 and a pulse generator 8. When the register 6 receives the pulse motor drive command signal, it stores the transferred data N indicative of the number of pulses. The discriminator 7 determines whether the content of the register 6 is zero or not and produces a binary "1" signal when the content is not zero and "0" signal when the content is zero. The pulse generator 8 generates no pulse when the output of the discriminator 7 is binary "0" while it continuoulsy generates pulses of a predetermined constant frequency when the output of the discriminator 7 is binary "1". The output pulses from the pulse generator 8 are applied to the pulse motor driver 3, which includes a sequencer circuit 31, a switching circuit 32, a driving power supply 33 and series resistors 34. The sequence circuit 31 generates phase exciting signals for exciting phase windings in a particular sequence according to the intended exciting system of the pulse motor. For a four-phase pulse motor, for example, four phase exciting signals are generated in the particular sequence and in synchronism with the pulses produced by the pulse generator 8. The switching circuit 32 gates the currents supplied to the phase exciting windings of the pulse motor 4 from the driving power supply 33 through the series resistors 34, in accordance with the phase exciting signals applied from the sequence circuit 31, so that the phase windings of the pulse motor 4 are excited in the sequence adapted to excite them according to the intended exciting system in synchronism with the output pulses of the pulse generator 8 to drive the pulse motor 4. In this manner, the pulse motor 4 rotates by the given physical angle in response to each pulse from the pulse generator 8. The pulses generated by the pulse generator 8 are also applied to the register 6 to decrease the content N of the register 6 by one for each pulse. Accordingly, when the number of pulses generated by the pulse generator 8 reaches the number corresponding to the digital data transferred from the digital computer 1, the pulse motor 4 has been rotated by the physical angle corresponding to the number N and the content of the register 6 reaches zero. Thus, the output of the discriminator 7 assumes "0" and the pulse generator 8 stops the generation of pulses. The pulse motor 4 thus stops. The frequency of the pulses generated by the pulse generator 8 is determined by a maximum rotation speed of the pulse motor 4. For example, for a four-phase pulse motor having a stepping angle of 0.9° and driven in 1-2 phase exciting system so that the rotor is rotated by a physical angle of 0.45° per pulse, with a maximum rotation speed of 5 revolutions per second, the frequency of the pulses generated by the pulse generator 8 is 4,000 Hz. Assuming that the period of the timing signals of the timer unit 2 is 20 milli-seconds, the digital computer 1 is required only to send a signal indicative of value of "80" to the register 6 at each 20 milli-second time interval in order to drive the pulse motor 4 at its maximum rotation speed of 5 revolutions per second. That is, in programming the digital computer 1, it is allowed to allocate only a time required to execute a command of "load "80" to register 6" out of each 20 millisecond time interval, for driving the pulse motor 4, while allocate the remaining time period for execution of general data processing.

Figure 2:
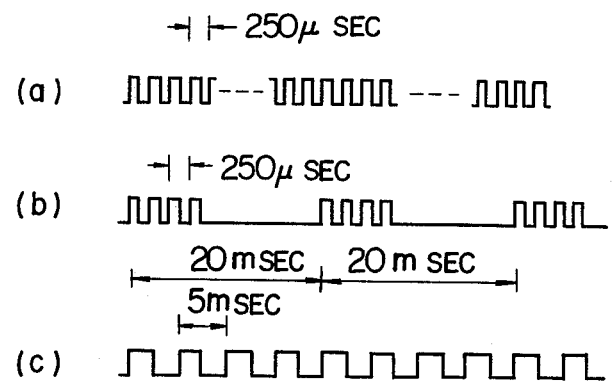
FIG. 2 is a timing chart of pulse motor driving pulses for explaining the operation of the control apparatus of the present invention.

The above embodiment is useful when the pulse motor is to be driven at a relatively high rotation speed because the time available by the digital computer for execution of general data processing is independent of the intended speed of the pulse motor. However, when the pulse motor is to be driven at a relatively low rotation speed, the above embodiment poses a problem with respect to smooth drive of the pulse motor. For example, in the circumstance described above where the pulse motor is to be driven at the rotation speed of 5 revolutions per second, the value "80" is loaded to the register 6 at each 20 millisecond interval and 80 pulses are sent from the pulse generator 8 to the pulse motor driver 3 at each 20 milli-second interval. That is, the pulse train having a period of 250 micro-seconds, as shown in FIG. 2(a), is sent to the pulse motor driver 3. On the other hand, when the pulse motor is to be driven at the rotation speed of 0.25 revolutions per second, for example, a value "4" is loaded to the register 6 and four pulses having a period of 250 micro-seconds are sent to the pulse motor driver 3 at each 20 milli-second interval, as shown in FIG. 2(b). In the latter case, the pulse motor is driven intermittently with the repetition of rotation and stop, that is, it is rotated by a physical angle of 1.8° according to four pulses for 1 millisecond and stops for 19 milli-seconds and again it is rotated for 1 milli-second. The time period of 19 milli-seconds is referred to a pause period. This situation is equivalent, in view of the resultant effects, to the case where a pulse motor having a stepping angle of 1.8° is continuously driven by pulses of a frequency of 50 Hz in the single phase exciting system or two-phase exciting system. Actually, however, the rotor of the pulse motor repeats a cycle of start-up, acceleration and stop at a period of 20 milli-seconds. This means that the pulse motor is always at transient state during its movement. Thus, in spite of the intention to reduce the mechanical vibration and noise by using a pulse motor having a small stepping angle and driving the same in the 1–2 phase exciting system to step a very small physical angle such as 0.45°, the mechanical vibration is not actually avoided.

Considering about a load burden to the pulse motor, the load has a proper vibration inherent thereto and if the frequency of the drive pulses for the pulse motor coincides with frequency of the proper vibration of the load a resonance may occur, which amplifies the vibration. The proper vibration of the load lies in a relatively low frequency band. Accordingly, the resonance is apt to occur when the pulse motor is driven intermittently at a relatively long period. In such resonance state, the larger the physical angle of rotation (1.8° in the above example) during one cycle of the intermittent driving (20 milli-seconds in the above example) is, the larger is the vibration of the load. Further, as described above, the period of the drive pulses generated by the pulse generator 8 is determined by the maximum rotation speed of the pulse motor and it is 250 micro-seconds (frequency of 4,000 Hz) in the above example. On the other hand, in order to assure that the pulse motor is rotated by the given physical angle in response to each of the drive pulses at the start of the pulse motor, the frequency of the drive pulses should be lower than a self-starting frequency, which is determined by a starting characteristic of the pulse motor upon application of a single drive pulse and decaying oscillation in the transient of the rotor caused by torque and moment of inertia of the load. Accordingly, depending on the condition of intermittent drive, the self-starting frequency may differ from that of the pulse motor continuously driven by a sequential pulse train. As a result, in case of intermittent drive, hunting wherein the physical angle of rotation of the rotor is not proportional to the number of input pulses and failure of start may occur.

Figure 3:
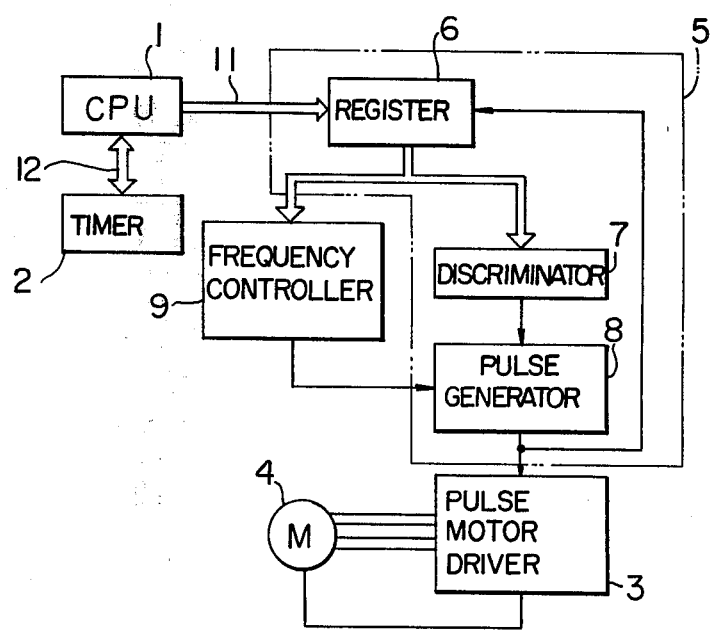
FIGS. 3, 4 and 5 show block diagrams illustrating a second embodiment of the control apparatus for driving the pulse motor in accordance with the present invention.

A second embodiment of the present invention is intended to overcome the above problems. Referring to FIG. 3, the second embodiment is explained. The digital computer 1 receives timing signals generated by the timer unit 2 through the bus line 12 at a given time interval T (seconds), and computes data indicative of the number N of pulses to be applied to the pulse motor driver 3 during the time interval T, based on the intended rotation speed of the pulse motor. The computed number N is sent as a data signal to the register 6 in the pulse control circuit 5, together with a pulse motor drive command signal, through the bus line 11. The register 6 stores the data of the number N of the pulses sent as the data signal in response to the pulse motor drive command signal. The data of the number N of the pulses is also applied to a frequency controller 9 which stores a value corresponding to the number N, e.g. a value proportional to the number N such as 2N, N, N/2. The discriminator 7 determines whether the content of the register 6 is zero or not to control the generation of pulses by the pulse generator 8. Namely, when the content of the register is not zero, the pulse generator 8 continues to generate pulses. In this case, the frequency f of the pulses generated by the pulse generator 8 is controlled by the frequency controller 9 so as to be proportional to the value stored in the frequency controller 9, that is, the data indicative of the number N loaded to the register 6 from the digital computer 1. The pulses generated at the above frequency are applied to the pulse motor driver 3 which drives the pulse motor 4. Those pulses are also applied to the register 6 to decrease the content of the register by one with each pulse so that before the content of the register reaches zero thereby stopping generation of the pulses, the generator produces the pulses as much as a number equal to a value N represented by the pulse number data transferred from the digital computer 1 thereby to rotate the pulse motor by the intended physical angle. The frequency controller 9 controls the frequency f of the pulses generated by the pulse generator 8 such that the frequency f is equal to N/T. As a result, the N pulses generated by the pulse generator 8 are uniformly distributed within the given time interval T determined by the timer unit 2. Thus, the pulse trains are generated in the successive time intervals with substantially the same period regardless of the magnitude of the number N. For example, let assume that a four-phase pulse motor having a stepping angle of 0.9° is driven in the 1–2 phase drive system at a rotation speed of 0.25 revolutions per second while the timer unit 2 generates timing signals at a repetition period T of 20 milli-seconds. Then, the digital computer 1 sends a signal indicative of a value "4" to the register 6 at each 20 milli-second interval. The frequency f of the pulse generator 8 is equal to 4/0.02 = 200 Hz. Thus, the pulses applied to the pulse motor driver 3 are sequential pulses having a repetition period of 5 milli-seconds as shown in FIG. 2(c). Accordingly, the pulse motor is not intermittently driven but driven in a continuous mode at a rate of a small physical angle of 0.45° per pulse.

In the above explanation, the frequency controller 9 receives the data of the pulse number N from the register 6. However, it may be arranged to receive directly the data from the digital computer 1. As is apparent from the above description, when the rotation speed of the pulse motor is to be changed, the data of the pulse number N is changed while the given time interval T determined by the timing signals of the timer unit 2 remains unchanged. Thus, since the repetition period of the timing signals of the timer unit 2 is constant, the apparatus can be constructed with less expense.

In the above embodiment, the pulse frequency f is equal to N/T. In this case, the pulses are generated at a constant rate of generation. Actually, however, it is difficult to precisely control the period of the pulses and the period of the timing signals, and certain errors are inevitably included. Accordingly, in order to assure that all of the N pulses are generated within the time interval between two adjacent timing signals, the frequency f of the pulse generator 8 is usually chosen to be slightly larger than N/T but not deviated therefrom more than allowable error range. If the frequency f is considerably larger than N/T, a pulse pause period may occur between the termination of a set of N pulses and the initiation of the next set of N pulses. However, so long as the pause period is not too long, it does not affect the smooth drive of the pulse motor. This will be further discussed later. The above explanation is also applicable to the following description.

The timer unit 2 is not necessarily provided. Instead, using the fact that the operation speed of the digital computer 1 is constant, the command to load the data of the pulse number required to drive the pulse motor to the register 6 may be executed each time the digital computer 1 completes a given amount of operation. Alternatively, when peripheral units other than the pulse motor are connected to the digital computer and any of the peripheral units has a function to produce signals similar to the timing signals produced by the timer unit and applicable to the digital computer 1 at a given time interval, such signals may be used to drive the pulse motor. Thus, the timer unit can be eliminated. In this manner, the construction can be simplified.

Figure 4:
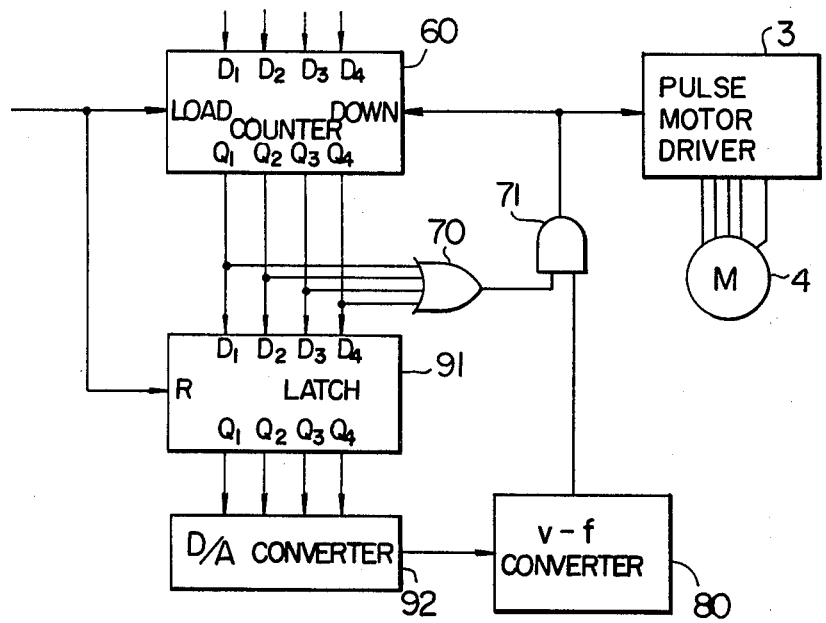

The circuit configuration of the embodiment of FIG. 3 will be explained in conjunction with FIG. 4. The register 6 comprises a 4-bit binary counter 60, the discriminator 7 comprises an OR gate 70 and an AND gate 71 which inhibits the application of the pulses to the pulse motor driver 3 when the output of the OR gate 70 is "0," the pulse generator 8 comprises a voltage-to-frequency converter 80, and the frequency controller 9 comprises a latch 91 and a digital-to-analog converter 92. The same reference numerals as those in FIG. 3 denote the same components, and the digital computer 1 and the timer unit 2 are not shown in FIG. 4.

The counter 60 receives at a LOAD terminal thereof the pulse motor drive command signal from the digital computer via the bus line and receives at data input terminals D1 to D4 the data of the pulse number N and stores that data. The latch circuit 91 has a reset terminal R, input terminals D1, D2, D3 and D4 and output terminals Q1, Q2, Q3 and Q4. When a trigger signal is applied to the reset terminal R, the content of the latch circuit 91 is updated by a data corresponding to signals being applied to the input terminals at that moment and holds the data even after the termination of the trigger signal and produces signals corresponding to its content at the output terminals. An example of the latch circuit 91 is an integrated circuit of Type SN-7475 made by Texas Instruments Incorporation in U.S.A. and commercially available. Since the pulse motor drive command signal is applied to the reset terminal R of the latch circuit 91 as the trigger signal, the content of the latch circuit 91 is updated by the data output of the counter 60, that is, the data of the pulse number, and the latch circuit 91 holds the data. The output of the latch circuit 91 is applied to the digital-to-analog converter 92 which produces an analog voltage V which is proportional to the pulse number N. The analog voltage V is then applied to the voltage-to-frequency converter 80 which generates a pulse train having a frequency f which is proportional to the voltage V and hence to the pulse number N. On the other hand, when the content of the counter 60 is not zero, the output of the OR gate 70 connected to the data output terminals Q1 to Q4 of the counter 60 assumes "1" level which is applied to one input of an AND gate 71 so that the output pulses of the voltage-to-frequency converter 80 are fed through the AND gate 71 to the pulse motor driver 3 to drive the pulse motor 4. Those output pulses are also fed to a DOWN terminal of the counter 60 so that the content of the counter 60 is counted down one by one. Thus, the content of the counter 60 reaches zero when the N pulses have been applied to the pulse motor driver 3. By selecting the pulse frequency f of the voltage-to-frequency converter 80 determined by the output voltage V of the digital-to-analog converter 92 to be equal to N/T, the repetition period of the pulses applied to the pulse motor driver 3 is always maintained at substantially constant.

While the counter 60 has been shown and explained as a 4-bit binary counter, it may be a counter of any number of bits having a similar function. Furthermore, while the above embodiment was explained to have the pulse motor rotated in one direction and to use the count-down type of counter, a reversible counter may be used when the pulse motor is to be rotated both in forward and backward directions. The data of the pulse number may be directly applied to the latch circuit 91 from the digital computer instead of the counter 60. Certain of conventional voltage-to-frequency converters has a control terminal to which a binary signal is applied to effect start and stop of the voltage-to-frequency converter. Thus, the voltage-to-frequency converter may includes a function of inhibiting circuit which selectively inhibits the supplication of pulses to the pulse motor driver.

According to the second embodiment of the present invention, the pulse number N is converted to an analog signal by the digital-to-analog converter. Accordingly, the adjustment of the pulse frequency f=N/T is facilitated.

Figure 5:
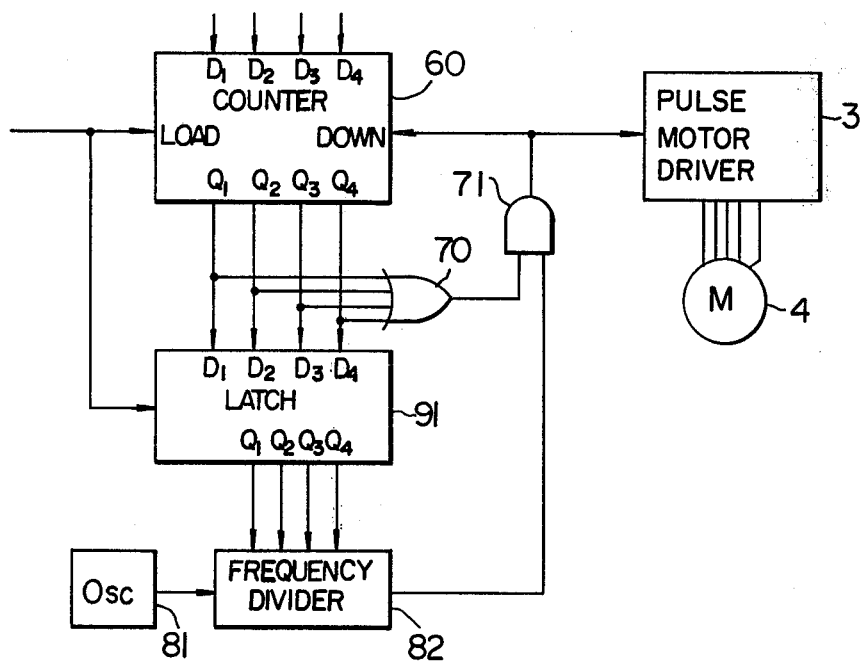

The embodiment of FIG. 3 may be implemented by a circuit configuration shown in FIG. 5. The configuration of FIG. 5 is similar to that of FIG. 4 except that the pulse generator 8 comprises an oscillator 81 and a frequency divider 82.

The pulses of a fixed frequency generated by the oscillator 81 are applied to the frequency divider 82. By applying the output of the latch 91, that is, the signal corresponding to the pulse number N, the factor of frequency division changes with variation of the pulse number N so that the frequency of the output pulses is proportional to the pulse number N. Other operations of the circuit are similar to those described in connection with FIG. 4.

The digital computer generally includes an oscillator to establish a basic timing of the operation of the digital computer. Therefore, such an oscillator may be used as the oscillator 81.

The circuit of FIG. 5 can be constructed at less expense because it does not include expensive circuits such as the digital-to-analog converter and the voltage-to-frequency converter. Furthermore, since the operation is controlled on the basis of digital signals, the frequency of the pulses applied to the pulse motor driver 3 can be very precisely maintained.

In the second embodiment described above, the data of the pulse number N are produced by the digital computer 1 at each given time interval T and the frequency f of the pulses of the pulse generator applied to the pulse motor driver is controlled by the number N such that the frequency f is equal to N/T. It should be understood that a similar effect is obtained when the time interval T during which a given number N of pulses are to be generated is determined by the computer and the data of the time interval T is used to control the frequency f of the pulse generator such that the frequency f is equal to N/T. A third embodiment shown in FIG. 6 is constructed to carry out the frequency control in such a manner.

Figure 6:
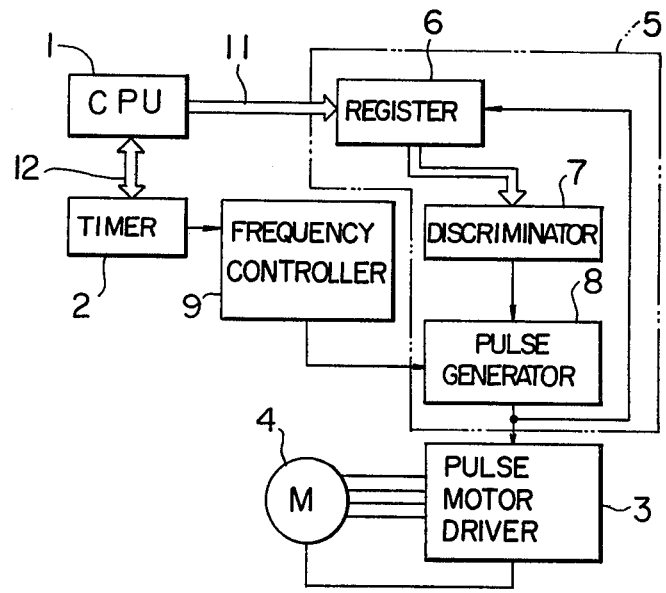
FIGS. 6 and 7 show block diagrams illustrating a third embodiment of the control apparatus for driving the pulse motor in accordance with the present invention.

In FIG. 6, the computer 1 loads the data of a given pulse number N to the register 6 at each of time intervals determined by the timing signals from the timer unit 2. The timing signals are generated by the timer unit 2 in the following manner. The computer 1 computes the time interval T during which the given number N of pulses are to be applied to the pulse motor in order to attain a desired rotation speed of the pulse motor and applies a signal indicative of the time interval T to the timer unit 2, which in turn generates a timing signal corresponding to the time interval T. Thus, the time interval T changes with variation of the desired rotation speed. On the other hand, the signal indicative of the time interval T is applied to the frequency controller 9 which in turn controls the frequency f of the pulses produced by the pulse generator 8 such that the frequency f is equal to N/T. The operations of the register 6, the discriminator 7 and the pulse drive circuit 3 are identical to those in the embodiment of FIG. 3.

Figure 7:
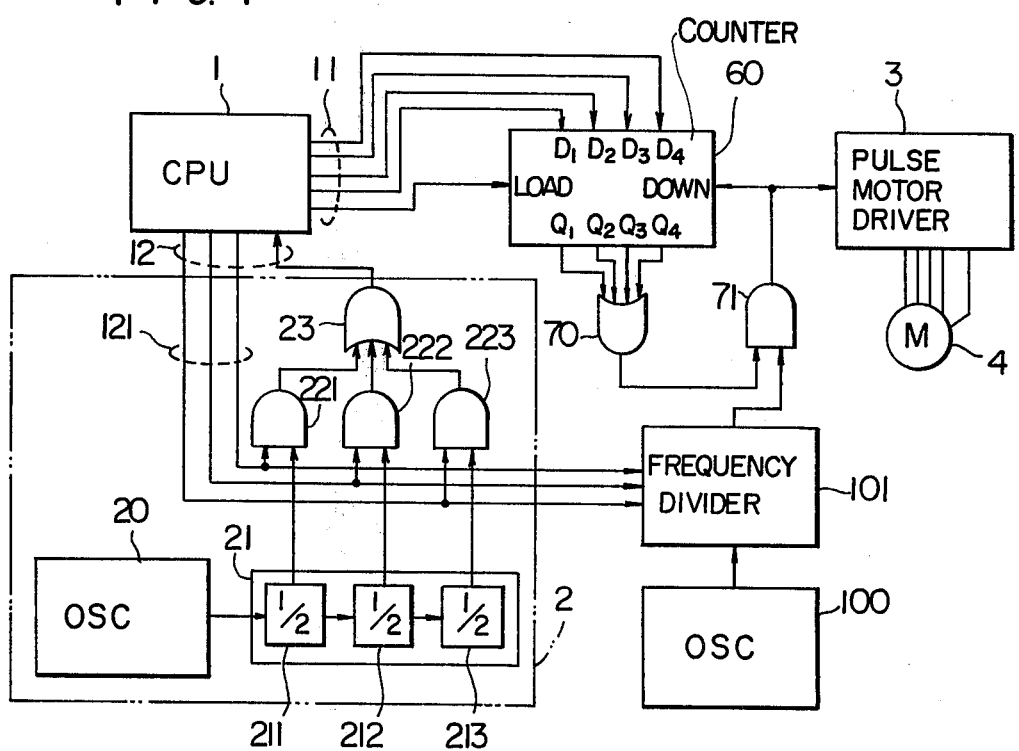

FIG. 7 shows a circuit configuration of the embodiment of FIG. 6. The timer unit 2 comprises an oscillator 20 for generating pulses of a fixed frequency, and a frequency divider 21 which includes a cascade-connected multi-stage frequency dividers 211, 212 and 213, each producing output pulses of a frequency which is a division of an input pulse frequency by a given factor, e.g. ½. The output pulses from the respective frequency dividers are applied to AND gates 221, 222 and 223, respectively, at one input terminal of each of them. The timer unit 2 receives the data of the time interval T from the computer 1 via signal lines 121. In the illustrated example, three signal lines are used to transfer a signal of high level "1" through one of them while a signal of low level "0" through each of the remaining lines so that three different time interval data 001, 010 and 100 can be selectively transferred therethrough. The three signal lines are connected to the other input terminals of the respective AND gates so that only one of the AND gates which receives the "1" signal allows the output pulses of the associated frequency divider to be applied, as the timing signals, to the computer 1 through an OR gate 23. The computer 1 counts the pulses applied thereto and produces a pulse motor driving command signal upon every counts of a predetermined number of the pulses. The command signal is applied to the LOAD terminal of the counter 60. In response to the command signal, the data of the given pulse number N is applied to the input terminal of the counter 60 to set the counter to N. For example, when the time interval T is given by 001, only the AND gate 223 gates to apply the output pulses of the frequency divider 213 to the computer 1, while when the time interval T is given by 010, the output pulses of the frequency divider 212 are applied. It will be readily understood that the period of the pulse motor drive command signals derived from the computer 1 in the latter case is one half of that in the former case. By increasing the number of stages of the frequency divider 21 and increasing the numbers of the signal lines and the AND gates accordingly, an increased number of different time intervals T are available. The signal indicative of a selected time interval T is also applied to a frequency divider 101 which receives output pulses produced by an oscillator 100 and having a constant frequency and divides the frequency of the received pulses by a factor corresponding to the selected time interval thereby to produce pulses of a frequency f equal to N/T. The operations of the remaining circuits are similar to those explained in FIG. 5.

In the present embodiment, the period of the timing signals derived from the timer unit is variable while the pulse number N is fixed. The oscillators 20 and 100 may be common or they may be replaced by an oscillator (not shown) included in the digital computer. If the rotation speed of the pulse motor can be preliminarily determined, the period of the timing signals may be adjusted either manually or by using a suitable control signal relating to determination of the rotation speed of the pulse motor.

According to the embodiment of FIGS. 6 and 7, the pulse number data may always be constant. Accordingly, by designing the circuit such that the register 6 is updated by the number data N in response to the pulse motor drive command signal without receiving the data of the pulse number from the digital computer, resulting in no need of transfer of the data of the pulse number.

In the embodiments described above, the pulse train applied to the pulse motor driver is modified to be a continuous pulse train having a substantially constant frequency by changing the repetition period of the pulses in accordance with the rotation speed of the pulse motor. However, it is not always necessary to apply the continuous pulse train of a constant frequency to the pulse motor driver in order to attain the object of the present invention. As described above, the hunting and the failure in start-up are related to the self-starting frequency determined by the dynamic characteristics of the pulse motor and the load, and the mechanical vibration and the noise are related to the physical angle of rotation driven during each cycle of intermittent driving. Accordingly, when the rotation speed of the pulse motor is relatively small, that is, when the frequency of the pulses generated is relatively low and when the physical angle of the pulse motor driven by each pulse is small, the above problem will not occur.

Figure 8:
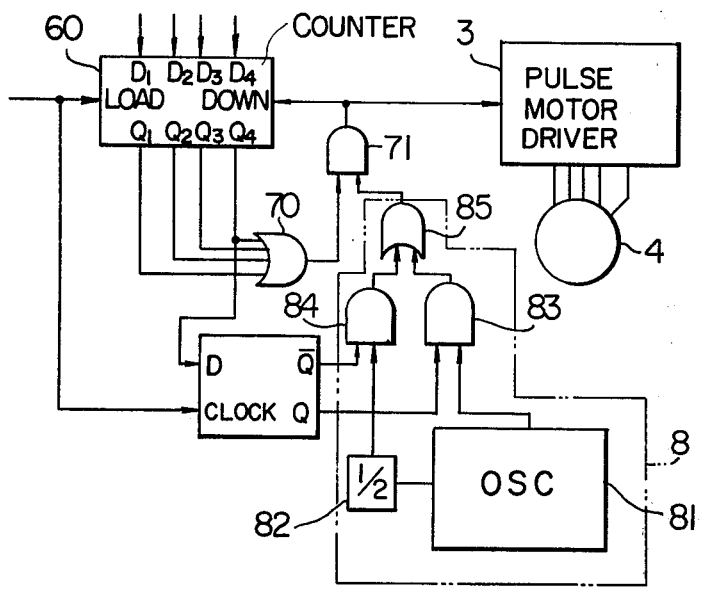
FIG. 8 shows a block diagram illustrating a fourth embodiment of the control apparatus for driving the pulse motor in accordance with the present invention.

An embodiment shown in FIG. 8 is constructed taking the above factors into consideration. In FIG. 8, a flip-flop 93, which may be an integrated circuit of Type SN 7475 made by Texas Instruments Incorporation and commercially available, is triggered when the pulse motor drive command signal is applied to the clock terminal CLOCK thereby producing "1" signal at the $\bar{Q}$ terminal if a signal "0" exists at the terminal D. The signal from the terminal $\bar{Q}$ is applied to one input of an AND gate 84 to open it. On the other hand, the data of the pulse number N is applied to and stored in the counter 60, and a 4-digit binary signal corresponding to the number N is produced at output terminals Q1, Q2, Q3 and Q4. When the stored number N is larger than one half of the maximum number Nm for the pulse number data, the most significant digit thereof appearing at the output terminal Q4 assumes "1", which is then applied to the terminal D of the flip-flop 93. Thus, the output from the $\bar{Q}$ terminal of the flip-flop 93 assumes "0" while the output from the Q terminal assumes "1". Accordingly, the AND gate 84 is closed while another AND gate 83 is opened. When the number N is smaller than one half of Nm, the output at the Q4 terminal of the counter 60 assumes "0" and the AND gate 84 remains opened. Accordingly, when the number N is large, the output pulses of the oscillator 81 are applied to the pulse motor driver 3 through the AND gate 83 and an OR gate 85. On the other hand, when the number N is small, output pulses of a frequency divider 82, which divides the frequency of the output pulses of an oscillator 81 by two, are applied to the pulse motor driver 3 through the AND gate 84. In this manner, in the present embodiment, it is determined whether the intended rotation speed of the pulse motor is higher or not than one half of the predetermined maximum speed thereof, and in case of the latter the drive pulses of a half frequency of that in the former case are generated. As a result, the pulse motor is driven intermittently except when the rotation speed of the pulse motor is equal to the maximum speed or one half thereof. However, no significant problem occurs if the conditions described above are met.

In FIG. 8, the flop-flop 93 may be replaced by a digital-to-analog converter, a comparator and an inverter. In this case, the data of the pulse number is converted to an analog signal by the digital-to-analog converter and the analog signal is compared with a predetermined reference level corresponding to a half of the maximum rotating speed. When the analog signal is larger than the reference level, the comparator produces a "1" signal. This signal and an inverted signal thereof produced by the inverter are applied to the pulse generator 8.

The embodiment of FIG. 8 provides a circuit arranged which is simple in construction and inexpensive.

In the above embodiments, the data of the pulse number N transferred from the digital computer is stored in the register and the content of the register is decreased for each occurrence of the drive pulses, and when the content of the register reaches zero the generation of the pulses is stopped. However, when the frequency controller is used such that the relation of f=N/T is always maintained among the pulse number N, the period T of the timing signals and the frequency of the pulses, it is not necessary to confirm whether the pulses as many as the pulse number data N have been applied to the pulse motor driver because the number of pulses generated during the given time interval T is always equal to N.

Figure 9:
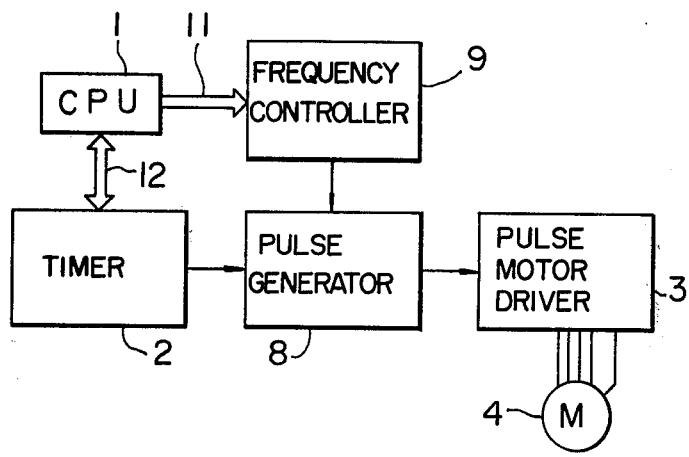
FIGS. 9 and 10 show block diagrams illustrating a modification of the control apparatus for driving the pulse motor in accordance with the present invention.
Figure 10:
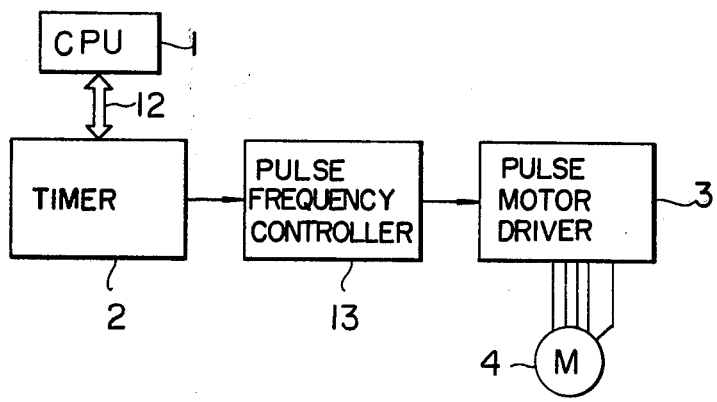

Such modification of the present invention which omits the circuit for confirmation of the number of pulses actually applied to the pulse motor driver are shown in FIGS. 9 and 10. In FIG. 9, the data of the pulse number N is derived from the digital computer 1 in response to each of the timing signals generated by the timer unit 2 at a time interval T and stored in the frequency controller 9. This data is maintained therein until the digital computer 1 derives the next data of the pulse number. The frequency controller 9 controls the frequency f of the pulses produced by the pulse generator 8 such that the frequency f is equal to N/T. Thus, N pulses are applied to the pulse motor driver 3 during the time interval T and the pulse motor is driven thereby. The frequency controller may comprise a latch 91 and a digital-to-analog converter 92 as shown in FIG. 4, and the pulse generator 8 may comprise a voltage-to-frequency converter 80. Alternatively, the frequency controller 9 may be a latch 91 as shown in FIG. 5 and the pulse generator 8 may comprise an oscillator 81 and a frequency divider 82.

In FIG. 10, a pulse frequency controller 13 maintains the pulse number N at constant and maintains the frequency f of the pulses at substantially N/T by adjusting the period T of the timing signals of the timer unit. Thus, the pulse motor 4 is continuously driven by the pulse motor driver 3. The timer unit 2 may be similar to the timer unit 2 shown in FIG. 7 and the pulse frequency controller 13 may comprise a pulse generator 100 and a frequency divider 101 as shown in FIG. 7.

The modifications of FIGS. 9 and 10 allow the simplification of circuit configuration to a great extent.

We claim:

1. A control apparatus for driving a pulse motor which is driven through a pulse motor driver to rotate by a predetermined physical angle with each of driving pulses being applied to said pulse motor driver, said control apparatus comprising:

means for successively producing timing signals at controlled time intervals, a counter responsive to each of said timing signals for being set at a number relating to the number of driving pulses to be applied to said pulse motor driver during a time interval between occurrence of said each timing signal and occurrence of the next one, first means for receiving and holding until the occurrence of the next timing signal the number set in said counter, second means for producing pulses adapted to be used as the driving pulses at a frequency controlled on the basis of said number held in said first means, third means for applying the pulses produced by said second means to said counter to decrease the content thereof by one with each of said pulses, and gate means for permitting said pulses produced by said second means to be applied to said pulse motor driver only when the content of said counter is not zero.

2. A control apparatus according to claim 1, wherein said controlled time intervals are of a predetermined constant length, and said second means includes means for converting the number held in said first means to an analog signal and means for generating pulses at a frequency corresponding to said analog signal.

3. A control apparatus according to claim 1, said controlled time intervals are of a predetermined constant length, and said second means includes a pulse generator for producing pulses at a predetermined constant frequency and means for dividing the frequency of said pulses by a given division factor, said division factor being changed by the number held in said first means such that the divided pulse frequency is proportional to said number.

4. A control apparatus for driving a pulse motor which is driven through a pulse motor driver to rotate by a predetermined physical angle with each of driving pulses being applied to the pulse motor driver, said control apparatus comprising:

first means for successively producing timing signals at controlled time intervals, second means responsive to each of said timing signals to receive and store digital data indicative of the number of driving pulses to be applied to said pulse motor driver during a time interval between said successive timing signals, and third means for successively producing a selected number of driving pulses at a controlled frequency during said time interval, said selected number being equal to a number corresponding to said stored digital data and said frequency being determined such that said selected number of driving pulses are produced within said time interval.

5. A control apparatus according to claim 4, wherein said timing signals are produced at predetermined uniform time intervals and said third means comprises a pulse generator for producing said driving pulses at a constant frequency determined in dependence upon the period of said uniform time intervals and the possible maximum number of driving pulses expected to be applied during said period, and means for preventing said pulse generator from producing more than said selected number of driving pulses during said time interval.

6. A control apparatus according to claim 4, wherein said timing signals are produced at predetermined uniform time intervals and said third means comprises pulse generating means for producing said driving pulses at a frequency which is variable depending on the number indicated by said digital data, and means for preventing said pulse generating means from producing more than said selected number of driving pulses during said time interval.

7. A control apparatus according to claim 6, wherein said pulse generator means comprises means for converting the digital data to an analog signal and means for generating said driving pulses at a frequency corresponding to said analog signal.

8. A control apparatus according to claim 6, wherein said pulse generator means comprises a pulse generator for producing said driving pulses at a constant frequency, and means for varying the frequency of said driving pulses depending on the number indicated by said digital data.

9. A control apparatus according to claim 4, wherein the number indicated by said digital data is a predetermined constant value and said controlled frequency is variable depending on the number indicated by said digital data.

10. A control apparatus according to claim 6, wherein said pulse generating means comprises means capable of generating said driving pulses at any one of two different frequencies and means for selecting one of said different frequencies depending on whether the number indicated by said digital data is larger than a predetermined reference value or not.

* * * * *